April 20, 1926. Re. 16,330

M. S. GEORGE

BABY PANTS

Original Filed April 6, 1922

Inventor

Maude Sinclair George

By

Chas. F. Wattan

Her Attorney

Reissued Apr. 20, 1926.

Re. 16,330

UNITED STATES PATENT OFFICE.

MAUDE SINCLAIR GEORGE, OF ST. LOUIS, MISSOURI.

BABY PANTS.

Original No. 1,491,690, dated April 22, 1924, Serial No. 550,164, filed April 6, 1922. Application for reissue filed August 20, 1925. Serial No. 51,477.

*To all whom it may concern:*

Be it known that I, MAUDE SINCLAIR GEORGE, a citizen of the United States, residing at St. Louis, in the State of Missouri, have invented a new and useful Baby Pants, of which the following is a specification.

The present invention relates to improvements in baby pants, which is a water proof garment worn by infants and small children over diapers and the like. The style of baby pants, to which the present invention is directed, is what is commonly termed by the trade as "all rubber pants" in contradistinction to those having the loose or removable cloth cover. These "all rubber pants" are usually made of rubberized cloth or rubber sheeting to form a full, bag-like trunk garment, having only waist and leg openings, with means about the openings for contracting them about the body and legs of the wearer.

It has been found that while such a garment has numerous advantageous features it possesses the drawback of excluding air from those portions of the body covered by the garment, resulting in a rather uncomfortable and unhealthy condition, as will be readily understood by those in the art. This is especially true in such garments when worn in the summer or in warm climates.

The object of the present invention is to overcome this drawback in pants of the all rubber type by inserting in a substantial portion of the pants means which will permit the ventilation by air passing all unhindered into the interior of the garment.

One of the features of the invention resides in the manner in which this ventilating means is positioned on the garment to give the maximum amount of ventilation without destroying the utility and characteristic properties of the "all rubber pants".

The invention further resides in the detailed construction of the garment and the arrangement of parts hereinafter more fully described and pointed out in the appended claims.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

In the drawings which disclose the invention in the embodiment in which it is at present devised:

Throughout the specification and drawings similar characters denote similar and like parts.

Figure 2:
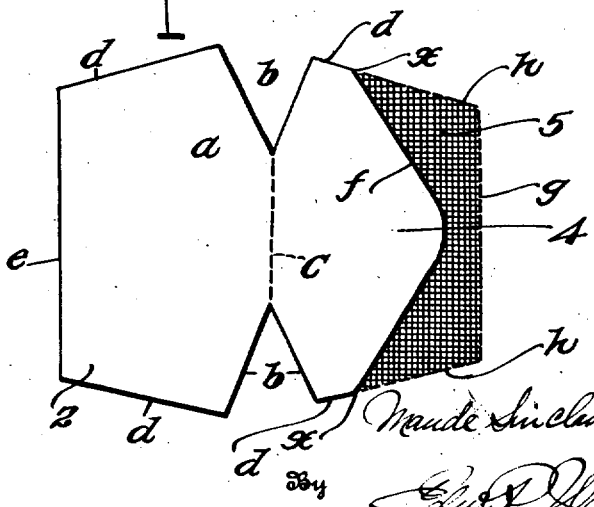
Fig. 2 is a plan view of a blank of rubber illustrating the pattern by which the garments are cut and before they are completed into the finished article.

In the preferred embodiment of my invention, as disclosed in the accompanying drawings, 1 indicates the front face of the garment, which is connected to the rear face 2 to produce a substantially bag-like trunk garment. The garment is preferably formed from a single elongated strip of material, preferably sheet rubber, or if desired, rubberized material. This strip of material *a*, see Figure 2, is provided in its side edges with suitable notches or cut away portions *b* which provide the leg openings 3 in the finished garment. This strip *a* may be folded transversely on the line *c* to form the front and rear portions 1 and 2, and these two portions are connected at their side edges *d* in any suitable manner.

The above method of forming the garment is illustrative of one of the ways in which it may be constructed, but it is obvious that any other arrangement can be made use of.

The edge *e* of the back face 2 of the garment provides the rear waist band portion of the garment, while the edge *f* of the front face 1 is cut away in the manner clearly illustrated, to provide the upwardly projecting shield 4, which in the finished garment is designed to lie substantially above the crotch of the wearer, but does not extend as far as the waist band. This is provided by cutting the blank *a* at points *x* a substantial distance from the leg openings *b* in the blank, and having the line of cuts from the points *x* converging outwardly.

To the edge *f* of the front face 1 is secured by any suitable means the lower edge of a net-like section of opened-weaved material 5. The upper edge *g* of the net section 5 extends transversely across the front face 1 of the garment and has its side edges *h* suitably secured to the opposing side edges *d* of the rear face 2. The edge *g* of the net section forms, together with the edge *e* of the rear face 2, the waist band of the garment.

The waist opening 6 of the garment and the leg opening 3 thereof may be contracted about the wearer by any suitable means or any form of closure though a particular form is shown in the drawing.

Figure 1:
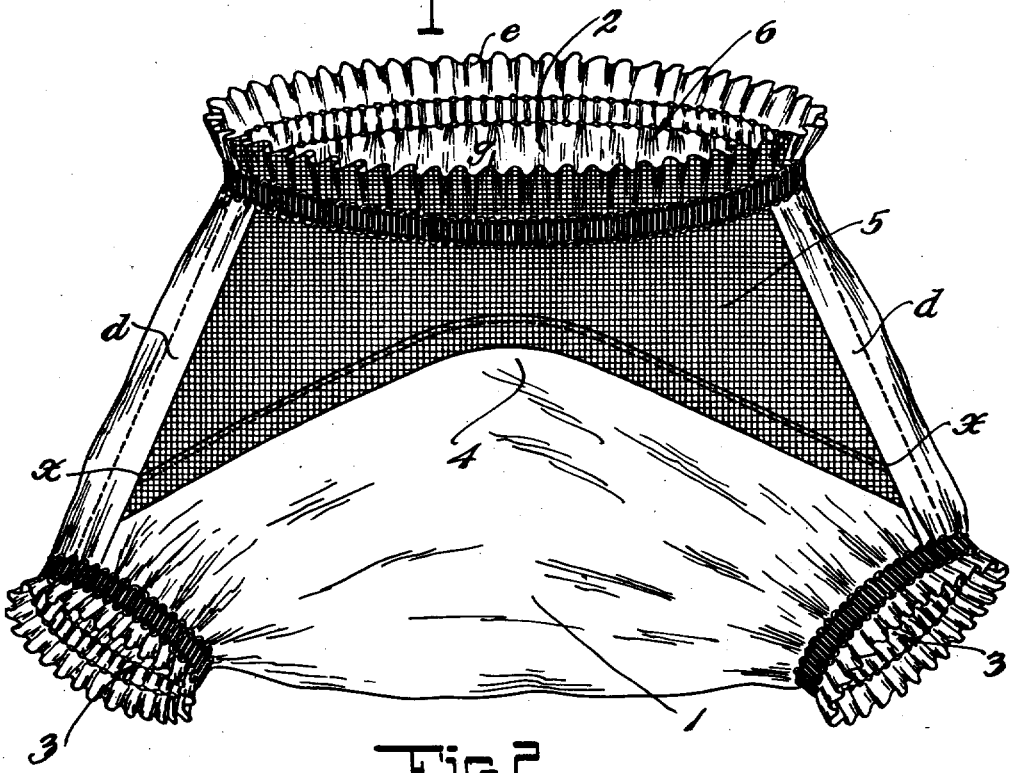
Figure 1 illustrates a front view of an "all rubber baby pants" embodying the present invention.

With a garment constructed in the above described manner and illustrated in Figure 1 of the drawing, it will be obvious that a maximum amount of ventilation is provided for by the net section 5 extending transversely across the upper front portion of the garment, the net section also providing the front portion of the waist band, which will permit the air to ventilate the waist band area. The lower side portions of the net section extend downwardly to a point near the leg openings of the garment in order to permit the maximum amount of ventilation, but are sufficiently spaced from the leg openings to prevent the egress of moisture from the pants at this point. The centrally arranged guard 4 on the front face 1 is designed to extend for a distance above the crotch of the wearer in order that any excretion may be directed to the lower portion of the garment and contained therein, in a manner which will be clearly understood.

The section of the front face of the garment which is occupied by the net insert 5 ordinarily has no particular utility in preventing the egress of moisture from the garment, when the garment is made entirely of rubber, because it is the usual and desired practice for the garment to be worn over an absorbent diaper which preliminary retains all moisture. This moisture tends to egress at points adjacent the leg openings and from the rear and crotch portions of the garment, and not from the upper front section of the garment. Therefore, this particular section is utilized in the present invention for ventilating purposes, while at the same time providing the protecting shield portion 4 above the crotch.

In this specification "all rubber pants" are referred to but it is to be understood that this type of garment is also adapted for use by women when made in larger sizes, and it is not desired to limit the use of the garment strictly to children. It is also to be understood that while the invention is shown as applied to "all rubber baby pants" it is not to be restricted to this use alone as it may be used in other designs and forms of waterproof pants.

Having thus described the invention, what is claimed as new, and upon which it is desired to obtain Letters Patent, is:—

1. A pair of bloomers comprising a rear face portion and a front face portion of impervious material, the said impervious front face portion being shorter than said rear face portion and terminating in an inverted V shape upper edge extending all above the crotch of the wearer and a net like section having an inverted V shape lower edge attached to the said upper edge of the front face portion to provide a substantially wide ventilating portion above the crotch of the wearer, the leg openings of the garment being surrounded by the impervious material of said front and rear faces.

2. A pair of bloomers comprising a back covering portion and a front covering portion formed of a single integral strip of impervious material having a plurality of leg receiving cut-out portions, said back covering portion being provided with a substantially straight upper edge and diverging side edges, said front covering portion being provided with an inverted V shape upper edge and a plurality of diverging side edges and a net like section having an inverted V shape lower edge connected to said upper edge of said front portion and having diverging side edges, and means connecting the side edges of said front covering portion and net like section to the side edges of said back covering portion whereby the leg openings of the garment are surrounded by the impervious material of the front and back covering portions of the garment.

3. A trunk-like garment having waist and leg openings, and a rear face portion and a front face portion of impervious material, the faces being seamed together at their side edges to form the leg openings surrounded by impervious material, the said impervious front face having portions terminating below the waist opening and an intermediate upwardly extending portion also terminating below the waist opening, and a section of pervious material attached to the face portion and extending to the upper edge of the garment to form a continuation of the front face portion.

4. A trunk-like garment having waist and leg openings, and a rear face portion and a front face portion of impervious material, the faces being seamed together at their side edges to form the leg openings surrounded by impervious material, the said impervious front face portion being shorter than the rear face portion and having its upper edge terminating below the upper edge of said rear face portion, and a net-like section attached to the upper edge of the front face portion and extending to the upper edge of the rear face portion to provide ventilated section above the crotch of the wearer.

5. A garment of the kind described comprising a closed bag-like trunk garment of impervious material having waist and leg openings, said leg openings being surrounded by the impervious material, the upper edge of the front face of the garment being cut away for a distance above the crotch portion thereof, and a section of foraminous material set in said cutaway portion and extending upward to the upper edge of the back face to complete the garment, the upper parts of said impervious back and said foraminous front portions forming said waist encircling opening.

In testimony whereof, I hereby set my hand this 3rd day of July, 1925.

MAUDE SINCLAIR GEORGE.